United States Patent [19]
Friday

[11] Patent Number: 5,856,779
[45] Date of Patent: Jan. 5, 1999

[54] MOTORCYCLE BRAKE LIGHT ENHANCEMENT SYSTEM

[76] Inventor: Leon L. Friday, 6701 W. Lake Anne Dr., Raleigh, N.C. 27612

[21] Appl. No.: 632,008

[22] Filed: Apr. 15, 1996

Related U.S. Application Data

[60] Provisional application No. 60/000,023 Jun. 8, 1995.

[51] Int. Cl.[6] ................................................ B60Q 1/44
[52] U.S. Cl. .................... 340/479; 340/464; 340/467; 340/472; 340/468; 340/691; 362/800; 307/10.8; 116/35 R
[58] Field of Search ................................ 340/436, 463, 340/464, 467, 468, 479, 691; 362/72, 800; 307/10.8; 116/35 R

[56] References Cited

U.S. PATENT DOCUMENTS

| | | | |
|---|---|---|---|
| 4,290,048 | 9/1981 | Cutlip et al. | 340/479 |
| 4,733,335 | 3/1988 | Serizawa et al. | 362/80 |
| 4,751,493 | 6/1988 | Miller | 340/468 |
| 4,857,890 | 8/1989 | Solow | 340/479 |
| 4,860,177 | 8/1989 | Simms | 362/72 |
| 4,928,084 | 5/1990 | Reiser | 340/479 |
| 5,166,672 | 11/1992 | Duneau | 340/815.77 |
| 5,175,528 | 12/1992 | Choi et al. | 340/331 |
| 5,264,826 | 11/1993 | Henderson et al. | 340/471 |
| 5,298,882 | 3/1994 | Tsai | 340/468 |
| 5,313,188 | 5/1994 | Choi et al. | 340/331 |
| 5,345,218 | 9/1994 | Woods et al. | 340/479 |

*Primary Examiner*—Jeffery Hofsass
*Assistant Examiner*—Daryl C. Pope
*Attorney, Agent, or Firm*—Mills & Associates

[57] ABSTRACT

A flashing motorcycle brake light enhancement system including a plurality of super bright light emitting diode (LED) modules which signal the driver of a following vehicle to slow down to avoid a rear-end collision. The application of the motorcycle's brake supplies input current to a plurality of (LED) modules via a flasher unit and connected wiring. The flashing circuit is controlled by a single, blinking light emitting diode, which is operated in combination with a resistor matched to a relay coil, to actuate a mechanical relay, which passes full battery voltage to the (LED) modules. In one embodiment the flashing (LED) modules are contained within weather-resistant housings which are attached in symmetrical arrangement and externally of the rear-mounted motorcycle brake light housing. In an alternative embodiment, the flashing (LED) modules and related components of the brake light enhancement system are mounted internally of the stock motorcycle brake light housing so as to be directed rearwardly and visibly to a driver in a following vehicle. The (LED) modules use very little electrical power and do not overload the pre-existing motorcycle brake light circuit. Further, this minimal use of electrical current causes no power variation and has no effect on the anti-lock braking system of motorcycle so equipped. The brake light enhancement system is provided in kit form so as to be adaptable to motorcycles of various manufacturers.

7 Claims, 4 Drawing Sheets

MOTORCYCLE BRAKE LIGHT ENHANCEMENT SYSTEM

This application claims the benefit of U.S. Provisional Application No. 60/000,023 filed Jun. 8, 1995 by Leon L. Friday for Improved Motorcycle Stoplight.

BACKGROUND OF INVENTION

1. Field of Invention

This invention relates generally to the operation of vehicle brake lights and, more particularly, to a brake light enhancement system for motorcycles.

Brake lights are one of the most important safety features included on any vehicle. Brake lights indicate when a vehicle's brakes are being applied to alert the driver of a following vehicle to slow down in order to avoid a rear end collision.

Despite the use of brake lights, the incidence of rear end collisions remains relatively high among motorcyclists. When motorcycles are stopped, especially when stopped behind other traffic, they are less visible than larger vehicles. Since the tail light is constantly illuminated on most motorcycles due to so-called "lights on laws", the illumination of the brake light may be hard to recognize when the motorcycle is near other vehicles with bright brake lights. Further, the transition of light brightness during braking may not be noticed if a following driver is not looking directly at the motorcycle as the brakes are applied.

Various alternative brake light systems have been developed in an effort to solve this problem. Such systems often cause brake lights to flash automatically. However, such alternatively brake light systems have numerous disadvantages which compromise rather than improve safety.

For example, many alternative systems utilize unreliable mechanical components such as incandescent bulbs, mechanical relays having physical contacts, cams, levers, and other mechanical parts which can cause the entire vehicle brake light system to fail. Thus, while such conventional flashing brake light systems provide an increased measure of safety when working properly, any improvement is clearly overshadowed by the possibility of a dangerous total brake light failure.

In addition, such alternative brake light systems may require extensive modification of the stock equipment for proper installation and function. Further, conventional flashing brake light systems impose an additional load on the electrical circuitry which can cause a power variation and result in failure of the anti-lock brake system found on many late model motorcycles.

The present invention solves these problems by providing a reliable flashing brake light enhancement system that may be added to the stock motorcycle brake light without any significant modification and without effecting the operation of the stock equipment thereby eliminating the risk of a total failure of brake lights and other related systems.

2. Description of Related Art

U.S. Pat. No. 5,345,218 to Daniel S. Woods discloses a flashing brake light system wherein a center high-mounted stop lamp flashes when the brakes are initially applied. After a predetermined duration, the center high-mounted stop lamp remains continuously activated until the brakes are removed. This system is intended for automobile use and requires additional components and complex circuitry not required by the present invention.

U.S. Pat. No. 4,290,048 to David S. Cutlip, et al. discloses a vehicle turn signaling apparatus which signals the direction of a turn by a simultaneous initiation of a right-turn indicator lamp and a left-turn lamp, one in a flashing mode to signal the turn direction, the other in a steady mode of illumination to provide a positional reference for the flashing lamp.

U.S. Pat. No. 4,860,177 to John B. Simms discloses a bicycle safety light which improves the visibility of the bicycle and rider in low light conditions by a constantly moving and converging pattern of light rows which visually direct a following driver to the center position of the rider and the bicycle. However, this system is neither brake actuated nor intended for motor vehicle use.

U.S. Pat. No. 5,264,826 to Steven Henderson, et al. discloses an emergency flasher circuit for use with motorcycles and bicycles for selectively applying the signal to one or both of the left and right turn indicator lights and a headlight of a motorcycle or bicycle, for alerting drivers of motor vehicles to the presence of the motorcycle or bicycle. This system is not utilized in conjunction with the brake light system.

U.S. Pat. No. 5,298,882 to Ching-Yuan Tsai discloses an LED display collision warning circuit which displays different warning indications in response to signals from a door-actuated circularly lighting and extinguishing circuit, a brake-actuated alternately flashing circuit, or a headlight-actuated night distance detection circuit so as to effectively prevent collisions and accidents.

U.S. Pat. No. 5,166,672 to Andre Duneau discloses an multiple indicator display having a plurality of miniature lamps for a rear light of an automotive vehicle comprising a number of compartments each of which is associated with a particular function such braking, fog lamp operation, direction indication, etc.

U.S. Pat. No. 4,928,084 to Steven M. Reiser discloses a vehicle brake light and display system utilizing a display screen having an array of light emitting diodes arranged to transmit a selected pattern or message in red light. Upon actuation of the brake of the vehicle in which the display screen is mounted, display of the message is disabled and all of the light emitting elements are energized to provide a solid display of red over the entire screen.

Finally, U.S. Pat. Nos. 5,175,528 and 5,313,188 to Robert S. Choi, et al. disclose battery powered flashing super luminescent light emitting safety warning lights for alerting drivers to the presence of bicyclists, joggers, and pedestrians along roadways during darkness. This system is not intended for vehicular use.

SUMMARY OF INVENTION

After much research and study into the above mentioned problems, the present invention has been developed to provide a motorcycle brake light enhancement system which overcomes the disadvantages and other shortcomings of the prior art.

The motorcycle brake light enhancement system includes an array of ultra-bright light emitting diodes (LEDs) which are mounted in close proximity to the motorcycle brake light and which flash automatically whenever the brake is applied to alert following drivers that the motorcycle is braking.

The ultra-bright LEDs uses very little electrical power and, thus, have minimal effect on the pre-existing brake light wiring.

In addition, the brake light enhancement system of the present invention is designed to be adapted to the existing brake light housing with no modification or changes to the existing wiring.

Further, the brake light enhancement system of the present invention will continue to operate in the event that the stock brake light bulb should burn out thereby providing a back-up brake light system.

In view of the above, it is an object of the present invention to provide a motorcycle brake light enhancement system including a plurality of ultra-bright light emitting diodes (LEDs) which flash automatically whenever the motorcycle brake is applied to signal the driver of a following vehicle to slow down to avoid a rear-end collision.

Another object of the present invention is to provide a motorcycle brake light enhancement system which uses very little electrical power and will not overload the pre-existing motorcycle brake light circuit causing a failure of the brake lights and other related systems such as anti-lock brakes.

Another object of the present invention is to provide a motorcycle brake light enhancement system which may be connected to the pre-existing motorcycle brake light circuit with no modification to the stock equipment or changes to the pre-existing wiring.

Another object of the present invention is to provide a motorcycle brake light enhancement system which eliminates some of the notoriously unreliable components of the prior art such as incandescent bulbs which can cause a failure of the entire motorcycle brake light system.

Another object of the present invention is to provide a motorcycle brake light enhancement system which functions independently of the stock brake light system in the event of a failure of the same to reduce the risk of operating the motorcycle without any brake lights at all.

Other objects and advantages of the present invention will become apparent and obvious from a study of the following description and the accompanying drawings which are merely illustrative of such invention.

DETAILED DESCRIPTION OF INVENTION

Figure 1:
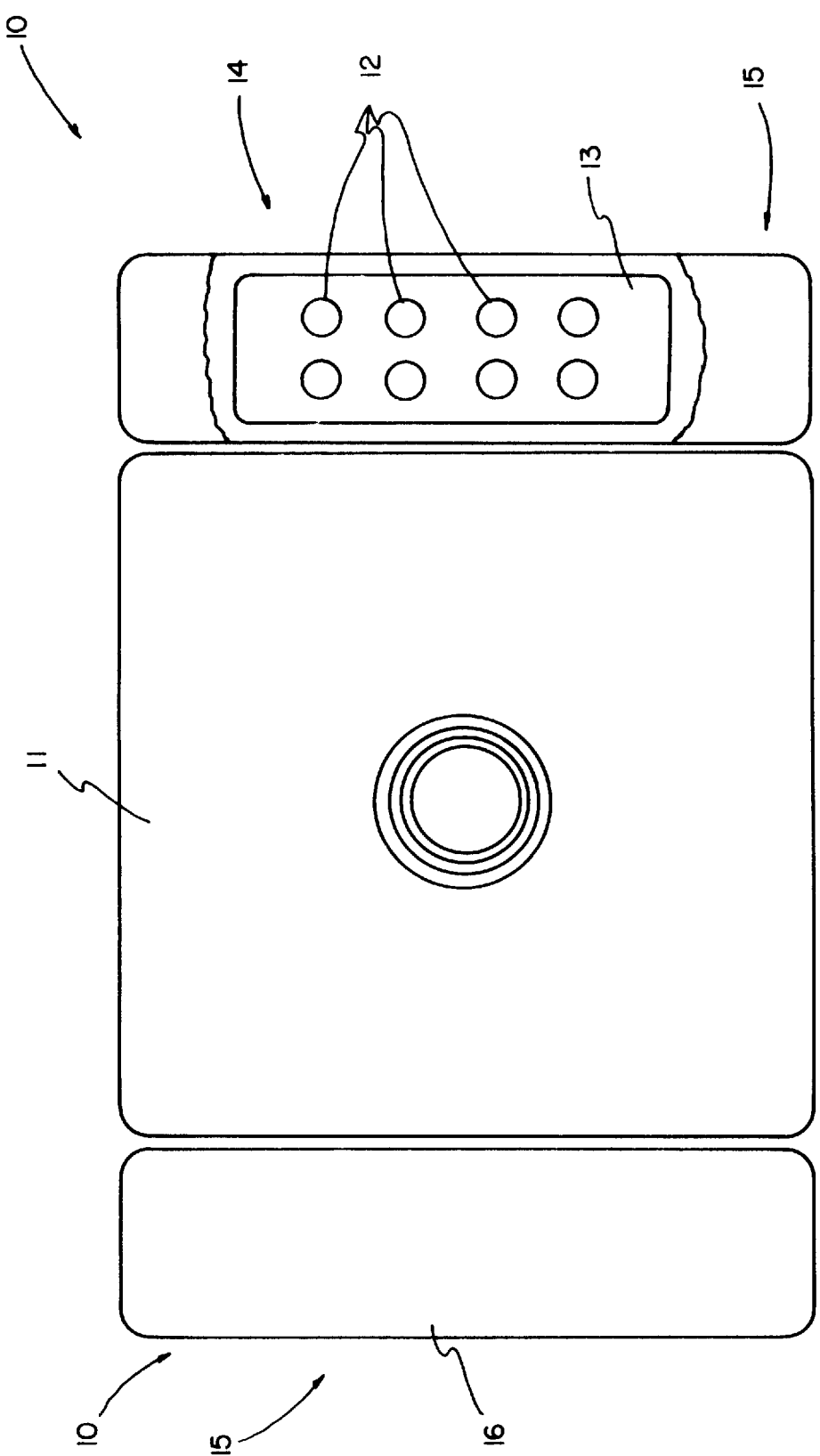
FIG. 1 is a partially cut away elevational view of a typical stock motorcycle brake light housing showing the brake light enhancement system of the present invention installed adjacent thereto.

With further reference to the drawings, the motorcycle brake light enhancement system in accordance with the present invention is illustrated in FIG. 1 and indicated generally at 10.

The brake light enhancement system of the present invention provides a rear-mounted, flashing brake light display which is illuminated whenever the motorcycle's brakes are being applied to signal the driver of a following vehicle to slow to avoid a rear-end collision.

In the preferred embodiment of the present invention, the brake light enhancement system 10 includes an array of super bright light emitting diodes (LEDs) 12 arranged in an insulated base structure 13 forming an (LED) display or module, indicated generally at 14, of unitary construction. Each respective LED module 14 contains a plurality of symmetrically positioned LEDs 12. In the embodiment illustrated in FIG. 1, a pair of LED modules 14 are disposed on either side of the stock motorcycle brake light housing 11 in a symmetrical arrangement therewith.

The (LEDs) may be arranged in various other configurations in accordance with the present invention as described hereinafter in further detail.

In the preferred embodiment the (LED) modules 14 are disposed within a weather-resistant housing, indicated generally at 15, including a high-impact plastic lens cover 16. Housing 15 may be conveniently formed of corrosion-resistant sheet metal, although plastic and other appropriate materials are suitable.

In the embodiment shown in FIG. 1, a pair of such weather-resistant housings 15 are fixedly attached to the stock motorcycle brake light housing 11 on either side thereof by known fastening means without permanent modification to the stock brake light housing 11. Critical to the present invention is the close proximity of (LED) modules 14 to brake light housing 11 which draw attention to the fact that the motorcycle is braking.

In an alternative embodiment, the (LED) modules 14 together with the other components of the present invention may be mounted internally of the stock brake light housing 11 without modification of the stock equipment on many models.

Thus, the brake light enhancement system 10 of the present invention will be made available in kit form wherein the components thereof are specifically adapted for mounting within the stock brake light housing 11 of different models of a particular motorcycle manufacturer.

Figure 2:
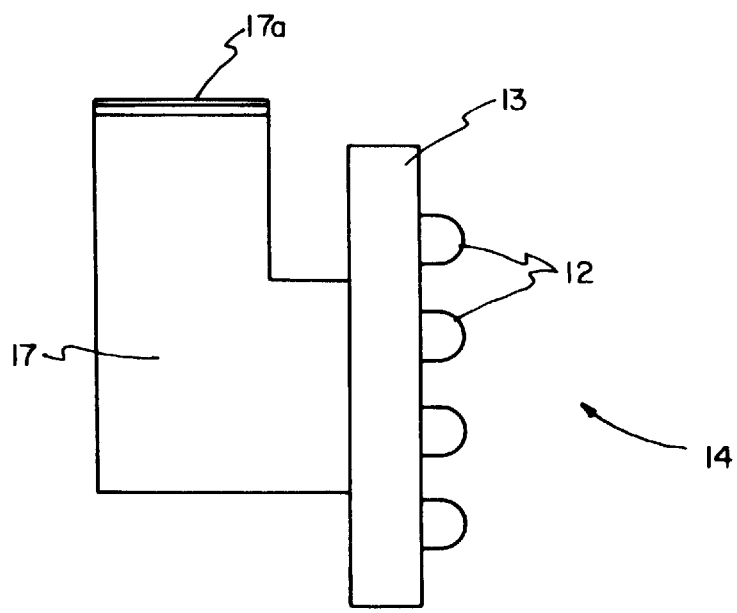
FIG. 2 is a side elevational view of the light emitting diode module of the present invention shown installed on a mounting bracket.

In this alternative embodiment the (LED) modules 14 are provided with a mounting bracket 17 as shown in FIG. 2. The mounting bracket 17 includes a spring clip portion 17a integrally formed thereto which is adapted for mounting the (LED) module 14 to a support bracket 23 of the stock brake light housing 11 as more clearly shown in FIG. 3.

It will be appreciated by those skilled in the art that mounting bracket 17 may be formed in various other configurations (not illustrated) so as to adapt the (LED) modules 14 for installation within the stock brake light housing 11 of a particular manufacturer. The mounting brackets 17 are configured so as to position the (LED) modules 14 within the brake light housing 11 such that the light emitted from each respective module 14 is directed rearwardly and is visible to the driver of a following vehicle.

A predetermined, flashing light pattern is emitted by the (LED) modules 14 whenever the motorcycle's brakes are applied. The flashing light pattern is controlled by a flasher unit 18 as shown in FIG. 3 which causes the (LED) modules 14 to be illuminated and extinguished at a predetermined frequency.

Figure 3:
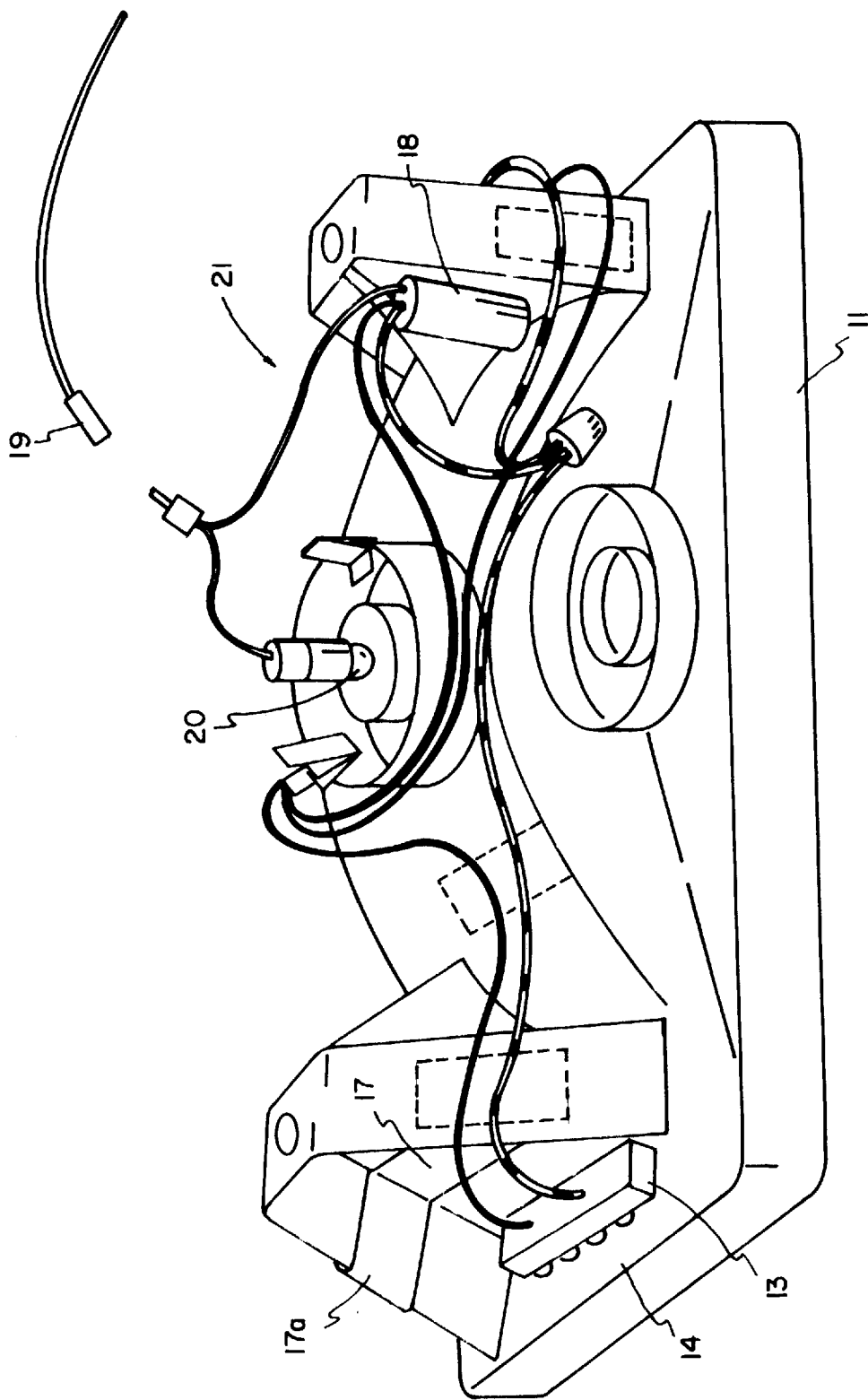
FIG. 3 is a perspective view showing the motorcycle brake light enhancement system of the present invention installed within a typical motorcycle brake light housing.

As illustrated in FIG. 3, the (LED) modules 14 and the flasher unit 18 together with the required wiring indicated generally at 21, are simply plugged into the pre-existing brake switch output wire 19 of the motorcycle brake light circuit. Thus, no modifications to the brake light housing 11 or cutting and splicing of wires is required to accomplish installation of the present invention.

Further, the components of the brake light enhancement system 10 are arranged in a circuit in parallel to the existing stock brake light circuit of the motorcycle and continue to operate in the event that the stop light bulb 20 should burn out. Thus, the stock brake light system can experience a total failure wherein the brake light enhancement system of the present invention effectively provides a back-up brake light system of exceptional reliability. This back-up function provides an added measure of safety to the operator of the motorcycle and prevents the situation wherein the motorcycle would be operated without any brake lights at all.

Figure 4:
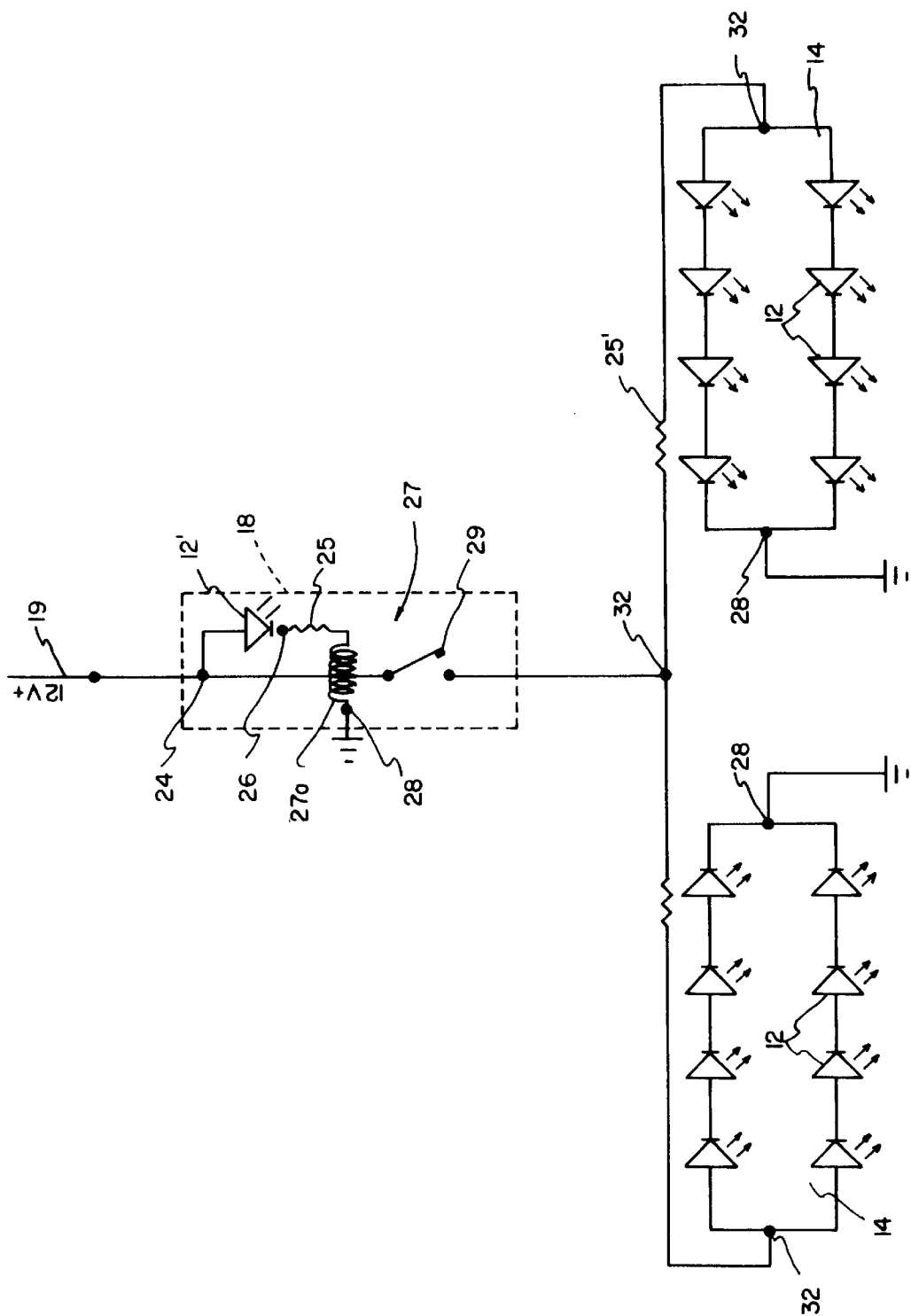
FIG. 4 is a schematic diagram of the components used in accordance with the present invention.

Turning now to FIG. 4, there is shown therein a schematic representation of the circuitry and components of the present invention. In practical use, the application of the motorcycle's brake supplies input current to the (LED) modules 14 by the depicted circuitry and components.

In operation a predetermined flashing light pattern is emitted by (LED) modules 14 whenever the motorcycle brake is applied actuating a brake light switch (not shown) which supplies 12 volt input current via the pre-existing brake switch output wire 19 to the flasher unit 18.

As can be seen from the electrical circuit diagram of FIG. 4, the major components of the flasher unit 18 are a blinking LED 12', a resistor 25, and a relay 27 including a relay coil 27a.

A significant feature of the present invention is that the flashing light pattern emitted by the LED modules 14 is controlled by the blinking LED 12'. The blinking LED 12' is connected by a conductor to direct 12-volt current from the brake light switch output wire 19 at input terminal 24. An output terminal 26 of LED 12' is connected by a conductor to resistor 25 which is connected by a conductor to one side of relay coil 27a of relay 27. The other side of relay coil 27a is connected by a conductor to a 12-volt negative terminal 28 as shown in FIG. 4.

A further connection is made from input terminal 24 to one of a pair 29 of coil operated contacts 29 of relay 27. An output side of contact pair 29 of relay 27 is connected by a conductor to each respective LED module 14.

In normal operation the output current of the blinking LED 12' passes through the resistor 25 and flows to the relay coil 27a.

Resistor 25 is preferably a 330 ohm resistor, this value having been found to provide relay coil 27a with a pulse output ideally suited for the flashing of LED modules 14.

When the coil 27a is energized, it actuates the relay 27, wherein the pair of contacts 29 pass a full 12 volts from input terminal 24 to the LED modules 14.

Thus, the output current of the flasher unit 18 is essentially the same 12 volts of input current without any appreciable voltage drop. This is advantageous in that when the contacts 29 close, there is an instantaneous surge of current which provides the maximum brightness in the LED modules 14 for the optimal attention-grabbing effect.

In the preferred embodiment, the blinking LED 12', the resistor 25, and the relay 27 including the relay coil 27a are encapsulated in a suitable insulating material such as polyester resin to form a flasher unit 18 of unitary construction.

In accordance with the present invention, the construction of the LED modules 14 will now be described in detail. The individual LEDs 12 utilized in the motorcycle brake light enhancement system 10 are of a generic type available from various electronic manufacturers. In the preferred embodiment, the LEDs 12 includes an eight degree lens so as to provide a concentrated beam of light which is projected to the rear of the motorcycle to the driver of a following vehicle.

In the manufacturing process, a plurality of LEDs 12 are initially disposed within a soldering jig which is configured to secure the LEDs 12 in the desired configuration.

Since such soldering jigs are well known to those skilled in the art, further detailed discussion of the same is not deemed necessary.

Next, the pre-existing terminals 12a extending from LEDs 12 are bent to the proper angle for soldering. Thereafter, the terminals 12a are clipped off to the desired length taking care to identify the positive and negative terminals 12a for soldering purposes.

Next, the individual LEDs 12 are arranged within the soldering jig such that the appropriate terminals 12a contact each other and are soldered together in rows of four each.

In the preferred embodiment, the LEDs 12 will be arranged in two parallel rows of four each wherein they are soldered together at the terminal ends of each row. It will be appreciated by those skilled in the art that the LEDs 12 may be arranged in parallel rows of eight, twelve, sixteen or as many as twenty individual LEDs 12 in various alternative configurations (not illustrated).

Next, a resistor 25' is soldered across the positive ends of each row of LEDs 12. In actual practice, it makes no difference whether the resistor 25' is connected to positive or negative end of each row of LEDs. Thereafter, an insulated wire is soldered to the resistor 25' on one end of the LED module 14 and another insulated wire is soldered to the opposite, negative end of the LED module 14.

Next, the two wires are secured together with a piece of shrink wrap tubing which is heated to shrink the same and secure the enclosed wires together.

Since such shrink wrap tubing is well known to those skilled in the art, further detailed discussion of the same is not deemed necessary.

Next, the soldered assembly of LEDs 12 is positioned within a mold wherein the assembled LED module 14 will be encapsulated in a suitable insulating material such as polyester resin by a liquid molding process.

Since such molding processes using encapsulating materials are well known to those skilled in the art, further detailed discussion of the same is not deemed necessary.

After the encapsulating material has cured, the completed LED module 14 is removed from the mold and is connected at an input terminal 32 to the output side of relay 27. The other side of the completed LED module 14 is connected by a conductor to a negative ground terminal 28.

The (LED) modules 14 use very little electrical power and, thus, do not overload the pre-existing brake light circuit. Total power use is less than 180 milli-amps (0.00180 amps). Since the stock brake light system is twenty-one watts and draws approximately 1.75 amps, the brake light enhancement system 10 adds less than 2 percent to the load on the stock brake light circuit.

This minimal use of electrical current causes no power variation and has no effect on the anti-lock brake system of a motorcycle so equipped, which is a disadvantage attributed to flashing brake light systems of the prior art.

From that above it can be seen that the present invention provides a simple motorcycle brake light enhancement system of exceptional reliability which functions to signal the driver of a following vehicle of a need to slow down to avoid a rear-end collision. The present invention including the (LED) modules and flasher unit have minimal parts and are designed to be an add-on feature with no modifications or changes to the pre-existing motorcycle wiring.

Further, the (LED) modules use very little electrical current in operation and, thus, cause no significant power variations. As a result, there is no perceptible pulse induced into the electrical system making the present invention compatible with modern anti-lock braking systems and bulb failure warning systems on those vehicles so equipped.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A brake-actuated motorcycle brake light enhancement system for use in combination with a pre-existing motorcycle brake light circuit, said system comprising:

light display means including a plurality of light emitting diode modules disposed in close proximity to a stock motorcycle brake light housing, said modules being directed rearwardly so as to be visible to the driver of a following vehicle; and flashing means including an alternating flashing circuit coupled to said light display means and to a brake switch of said motorcycle such that when said brake switch of said motorcycle is actuated, said modules are flashed in conjunction with the operation of said brake light circuit, said flashing means further including a blinking light emitting diode connected to the output of said brake switch, a resistor connected to the output of said diode, and a relay coil connected to the output of said resistor, said coil being matched to a resistance value of said resistor to enable said diode to control the operation of a relay connected to said coil, said blinking diode thereby controlling said flashing circuit.

2. The brake light enhancement system of claim 1 wherein said light display means are disposed within a weather resistant housing including a lens cover, said system including a pair of said housings being fixedly attached in symmetrical relation adjacent said stock motorcycle brake light housing.

3. The brake light enhancement system of claim 2 wherein said weather-resistant housings are mounted externally of said stock motorcycle brake light housing.

4. The brake light enhancement system of claim 1 wherein said light display means are mounted internally of said stock motorcycle brake light housing by connecting means fixedly attached thereto.

5. The brake light enhancement system of claim 4 wherein said connecting means include a mounting bracket fixedly attached to said modules, said bracket being configured so as to direct said light display means rearwardly when installed within said brake light housing so as to be visible to a driver in a following vehicle.

6. The brake light enhancement system of claim 1 wherein said system requires less than 180 milli-amps of electrical power in operation.

7. The brake light enhancement system of claim 1 wherein said system can be added on to said pre-existing motorcycle brake light circuit without modification of the same.

* * * * *